United States Patent [19]

Mazarac

[11] Patent Number: 5,825,564
[45] Date of Patent: Oct. 20, 1998

[54] REAR-MOUNTED VEHICLE MIRROR

[76] Inventor: Kevin P. Mazarac, 220 Monarch Dr., Apartment, J-24, Houma, La. 70364

[21] Appl. No.: 687,999

[22] Filed: Jul. 29, 1996

Related U.S. Application Data

[62] Division of Ser. No. 452,960, May 30, 1995, Pat. No. 5,550,681.
[51] Int. Cl.$^6$ .............................. G02B 7/182; B60R 1/08; B60D 1/40
[52] U.S. Cl. ...................... 359/872; 359/873; 359/874; 359/871; 359/881; 248/476
[58] Field of Search .................................... 359/872, 873, 359/874, 871, 881; 248/476

[56] References Cited

U.S. PATENT DOCUMENTS

| | | | |
|---|---|---|---|
| 4,925,287 | 5/1990 | Lord et al. | 359/872 |
| 5,309,289 | 5/1994 | Johnson | 359/872 |
| 5,313,337 | 5/1994 | Byers | 359/872 |
| 5,482,310 | 1/1996 | Staggs | 359/872 |

*Primary Examiner*—Cassandra C. Spyrou
*Assistant Examiner*—Mohammad Y. Sikder
*Attorney, Agent, or Firm*—Alfred J. Mangels

[57] ABSTRACT

A mirror support structure for mounting at the rear of a vehicle to support a mirror for convenient viewing of a trailer hitch element positioned at the rear of the vehicle. The trailer hitch can be observed while the observer is seated in the vehicle driver's seat. The mirror support structure includes a mounting member adapted to engage with and be supported by a surface at the rear of the vehicle, and a support arm that is slidably carried by the mounting member and that is positioned at an acute angle relative to the vehicle surface. A mounting arrangement is provided for securing a convex mirror to the support arm. The mirror support structure can include a mounting member for mounting on the upper portion of a tailgate of a pickup truck, or it can include a suction cup for mounting either on the surface of the trunk lid of a passenger car or on the surface of a rear window of a van or panel truck to permit laterally offset positioning of the mirror support structure to enable convenient viewing from the driver's seat of the trailer hitch area at the rear of the vehicle to permit backing of the vehicle to the trailer or vehicle to be towed, and also to permit connection thereto without requiring an additional person.

7 Claims, 4 Drawing Sheets

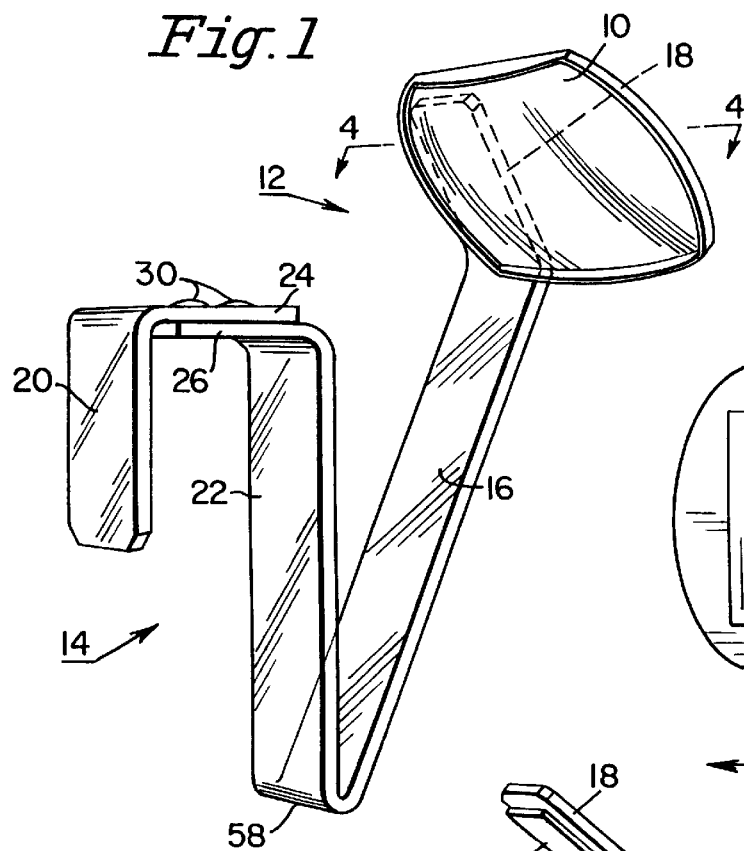
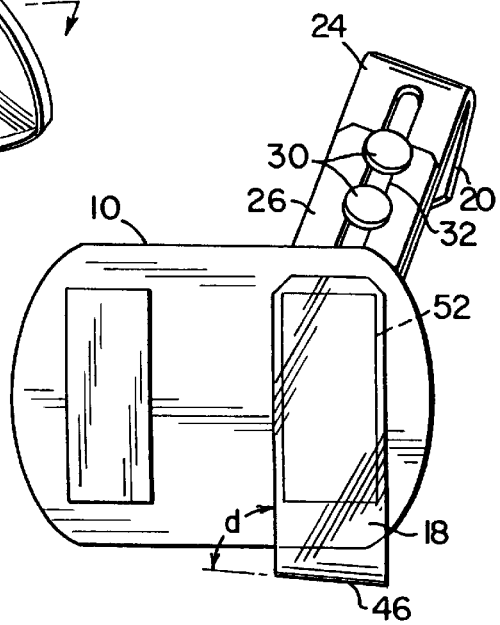
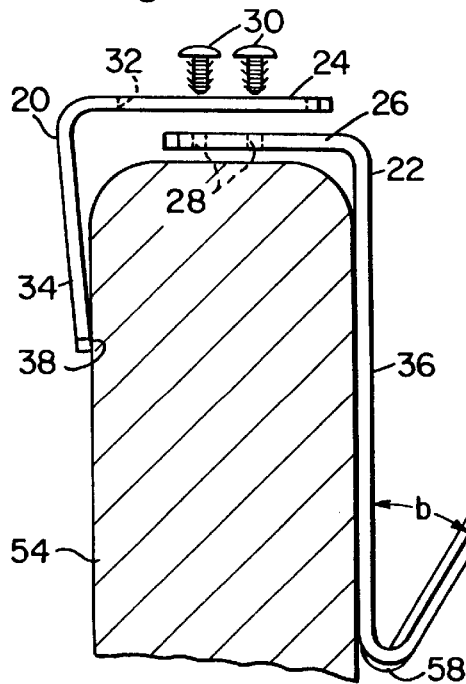
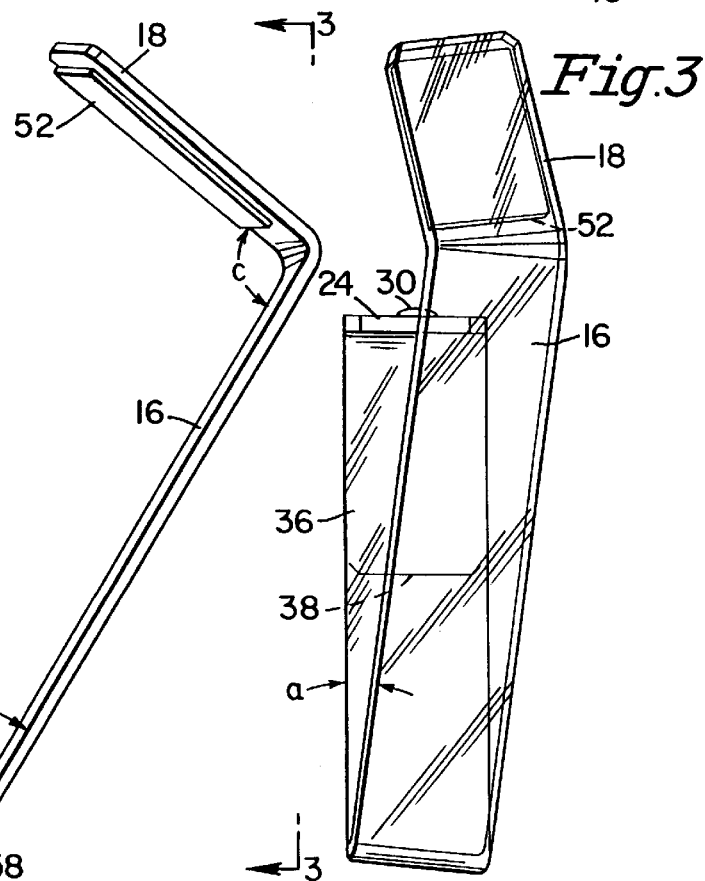

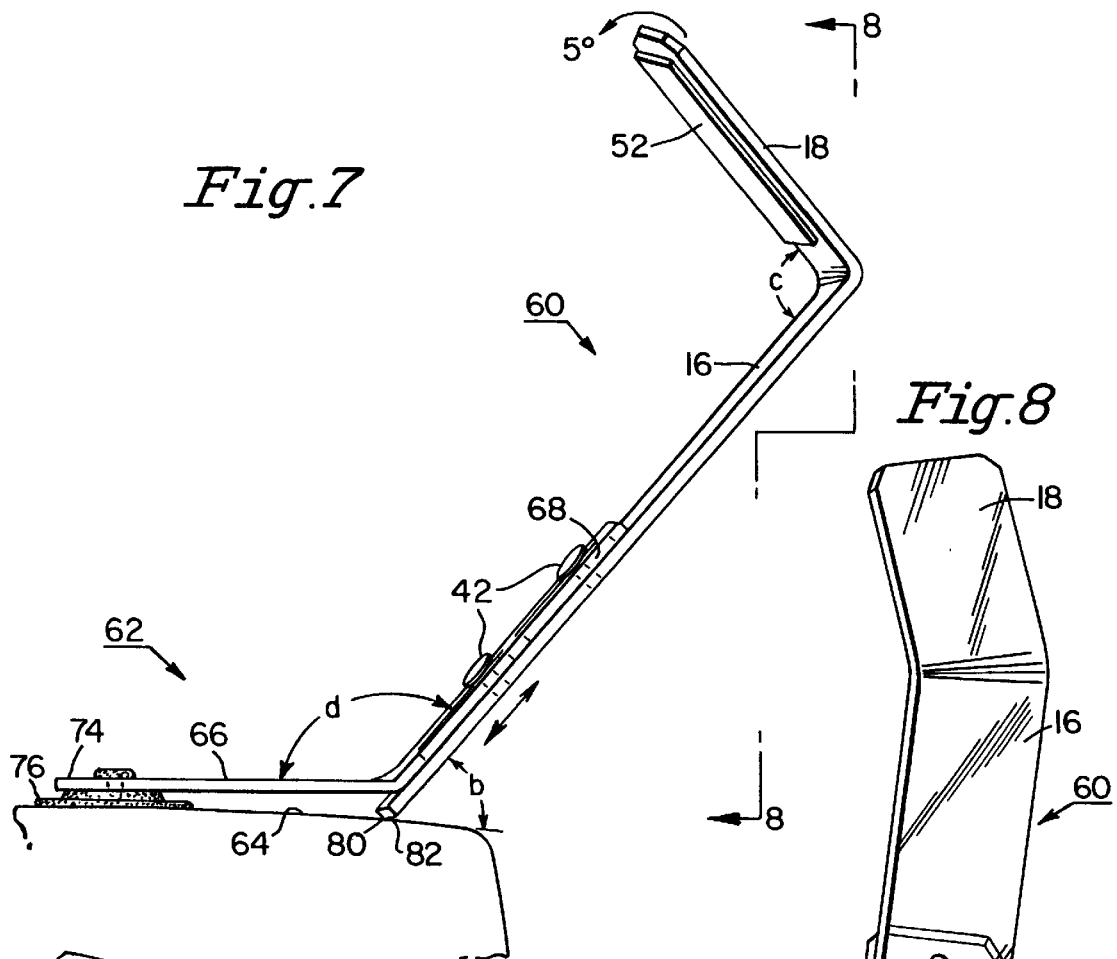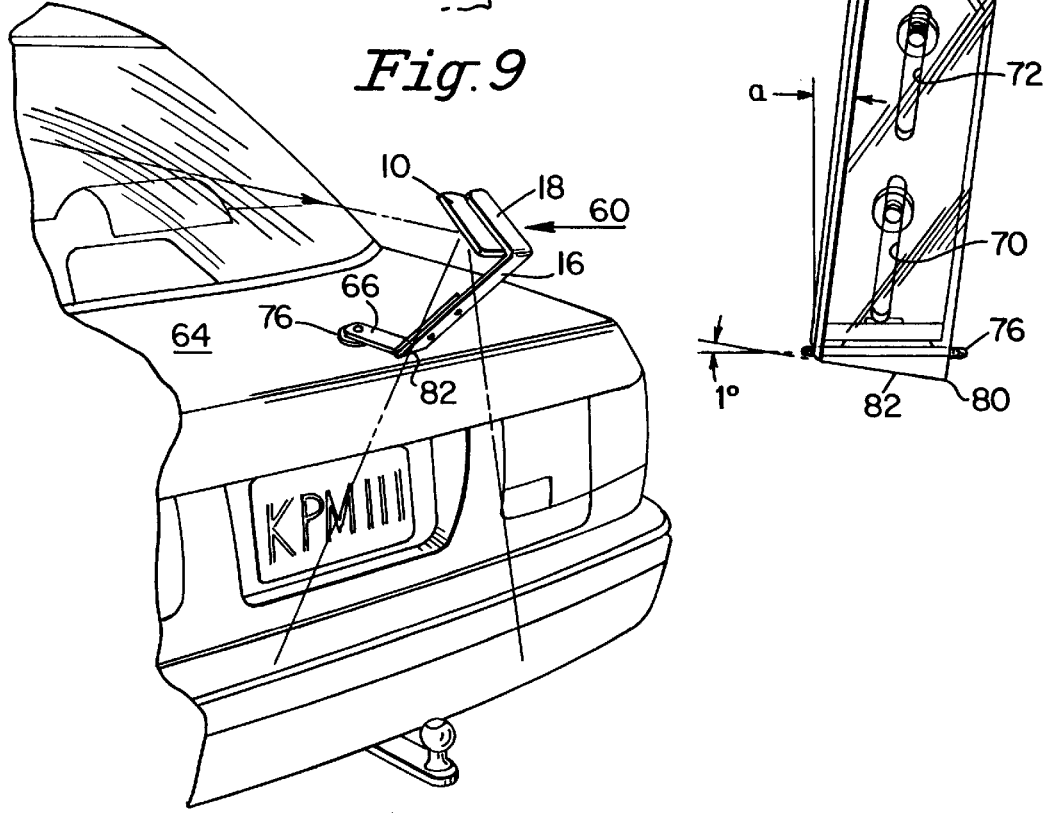

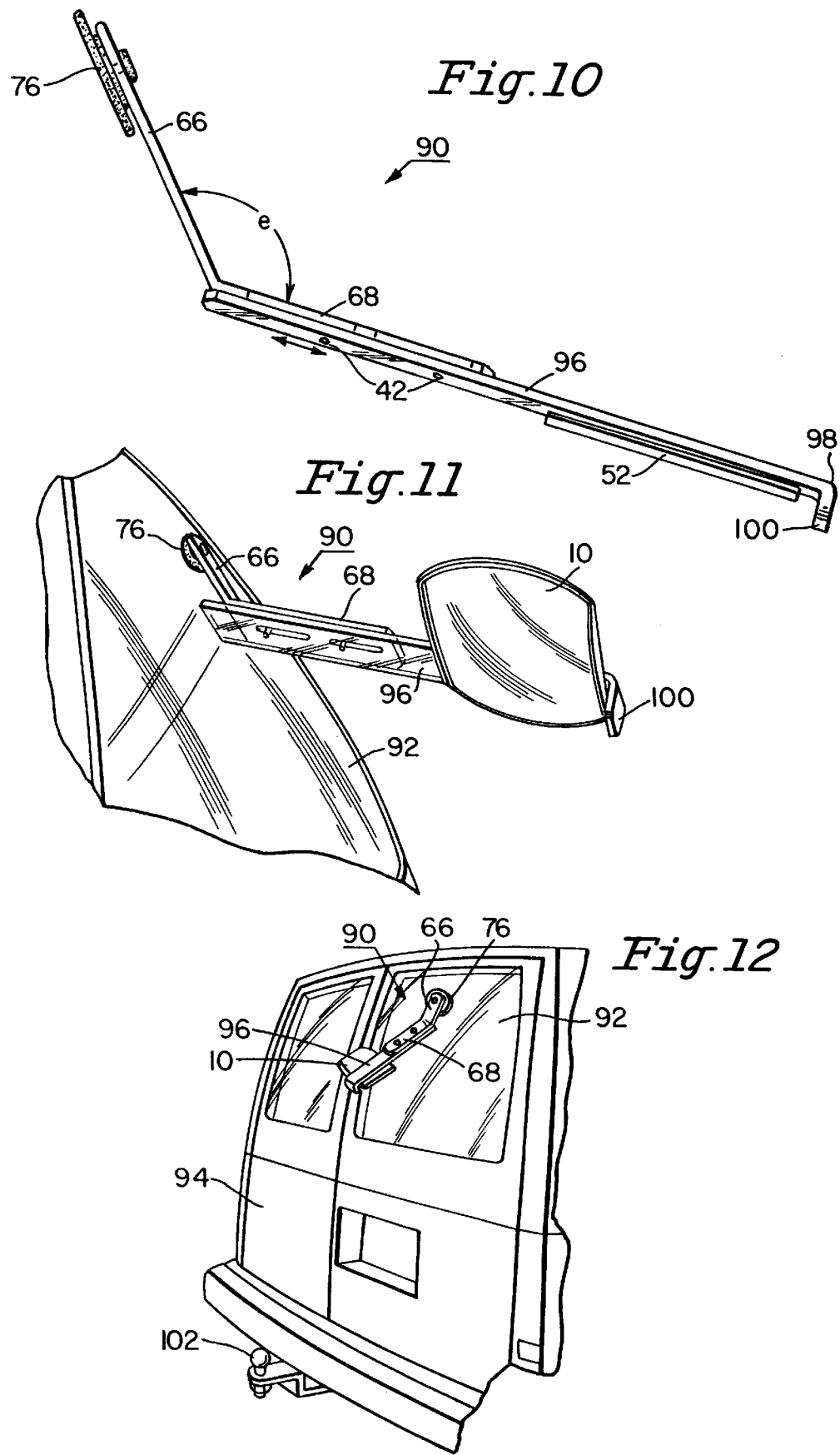

REAR-MOUNTED VEHICLE MIRROR

This application is a division of application No. 08/452,960, filed May 30, 1995 U.S. Pat. No. 5,550,681.

BACKGROUND OF THE INVENTION

1. Field of the Invention

The present invention relates to a mirror support structure for attachment of a mirror to the rear of a vehicle for permitting viewing of a trailer hitch area at the lower rear portion of the vehicle and while the observer is seated in the driver's seat. More particularly, the present invention relates to an improved mirror support structure for viewing a trailer hitch while seated in the driver's seat, wherein the mirror support structure is adapted for positioning at a point at the rear of the vehicle that is offset from the vehicle centerline, and wherein the mirror is supported on an arm that is slidably carried by a mounting member so that the position of the mirror can be changed to accommodate proper positioning of the mirror structure on different types of vehicles.

2. Description of the Related Art

Mirror support structures for positioning a mirror to enable viewing of a trailer hitch area at the rear of a vehicle are known. Examples of patents in which such mirrors for attachment at the rear of a vehicle are disclosed include U.S. Pat. No. 4,905,376, which issued on Mar. 6, 1990, to Rodger P. Neeley; U.S. Pat. No. 4,951,913, which issued on Aug. 28, 1990, to David M. Quesada; U.S. Pat. No. 5,111,342, which issued on May 5, 1992, to David M. Quesada; U.S. Pat. No. 5,180,182, which issued on Jan. 19, 1993, to James R. Haworth; and U.S. Pat. No. 5,309,289, which issued on May 3, 1994, to Brady G. Johnson. The Johnson patent shows that mirror carried by the towed vehicle whereas the other patents show the mirror carried by the towing vehicle.

With the exception of the structure illustrated in the Quesada '913 patent, the mirror structures disclosed in the patents listed above are intended to be positioned on the centerline of either the towing vehicle or the towed vehicle. The use of such mirrors permits the driver of a towing vehicle to directly observe, while seated in the driver's seat, the trailer hitch area while the vehicle is being maneuvered into position to connect or disconnect the towing vehicle with the towed vehicle. However, there are times when the vehicle structure does not permit such a central arrangement, such as, for example, a van having rear doors that together define a frame that is centrally positioned and thereby prevents direct viewing because of the interfering frame structure. Additionally, the driver of the towing vehicle may prefer that the trailer hitch mirror be offset several inches from the vehicle centerline so as not to interfere with the rear view during times other than when a towed vehicle is being connected to or disconnected from the towing vehicle.

The Quesada '913 patent permits off centerline positioning of a rear mounted mirror on a pickup truck, but the structure is quite complicated, requiring numerous parts, and thereby involving an excessive cost to produce the device.

It is an object of the present invention to overcome the shortcomings of the prior art structures and to provide an improved rear mounted mirror for observing a trailer hitch area of a vehicle, to facilitate connection with and disconnection from a towed vehicle.

SUMMARY OF THE INVENTION

Briefly stated, in accordance with one aspect of the present invention, a mirror support structure is provided for positioning at the rear of a towing vehicle for observing a trailer hitch while the observer is seated in the vehicle. The support structure includes a mounting member for removable connection with a surface at the rear of the towing vehicle and at a position above the rear bumper. A support arm extends angularly from the mounting member and is disposed at an acute angle relative to the vehicle surface. A mirror mounting arm extends from an end of the support arm for supporting a convex mirror in a forward facing direction. The support arm is arranged to permit the mirror to be conveniently positioned to enable clear and unobstructed viewing of the trailer hitch area with the mirror mounted at a position that is offset relative to the vehicle centerline.

BRIEF DESCRIPTION OF THE DRAWINGS

FIG. 1 is a perspective view of one embodiment of a mirror support structure in accordance with the present invention, for mounting on the tailgate of a pickup truck.

FIG. 2 is a side elevational view of the mirror structure shown in FIG. 1, with the mirror removed and the mounting member disassembled.

FIG. 3 is an end view of the mirror assembly shown in FIG. 2, taken along the line 3—3 thereof.

FIG. 4 is a top view of the mirror assembly shown in FIG. 1, taken along the line 4—4 thereof.

FIG. 7 is a side elevational view of a second embodiment of a mirror support structure in accordance with the present invention, for mounting on the trunk lid of a passenger vehicle.

FIG. 8 is a rear elevational view of the mirror structure shown in FIG. 7 taken along the line 8—8 thereof.

FIG. 9 is a fragmentary rear perspective view of an automobile that includes a mirror support structure of the type shown in FIG. 7 mounted in operative position on the trunk lid.

FIG. 10 is a side view of a third embodiment of a mirror support assembly in accordance with the present invention, for mounting on a rear window of a van or panel truck.

FIG. 11 is a fragmentary view looking upwardly at a van rear window with the mirror assembly shown in FIG. 10 in place and supported on the rear window.

FIG. 12 is a fragmentary rear perspective view of a van with a mirror support assembly of the type shown in FIG. 10 mounted in operative position on one of the rear window panes of a van.

DESCRIPTION OF THE PREFERRED EMBODIMENT

Figure 5:
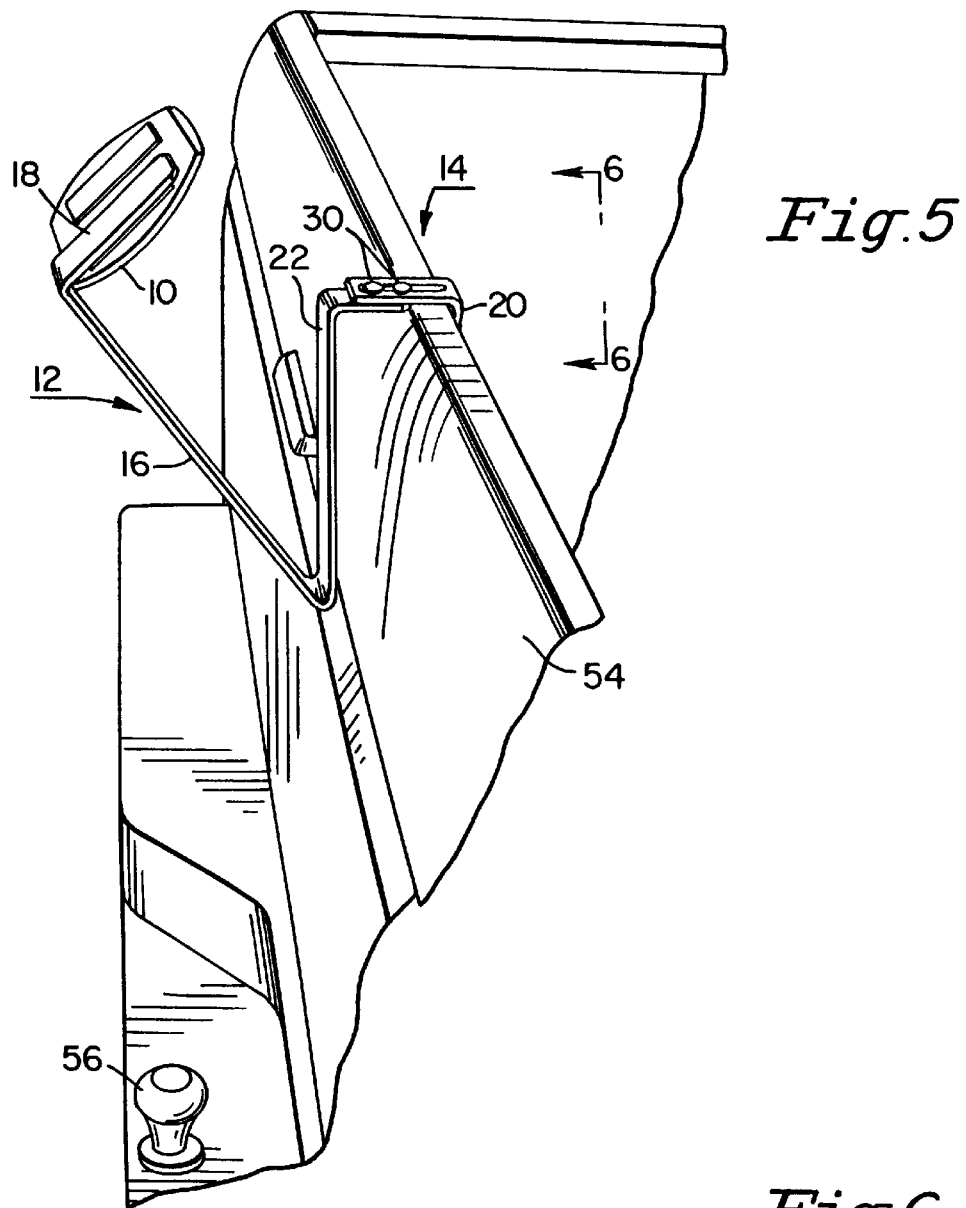
FIG. 5 is a fragmentary perspective view showing the mirror assembly of FIG. 1, mounted in operative position on the tailgate of a pickup truck.

Referring now to the drawings, and particularly to FIGS. 1 through 4 thereof, there is shown a convex mirror 10 carried by a mirror support 12 adapted to be mounted at the rear of a vehicle (not shown) and in a generally forwardly-facing direction. In the structural embodiment of the invention as illustrated in FIG. 1, mirror support 12 is configured to enable it to be positioned on the top edge of a vertically extending tailgate of a pickup truck, or the like, as shown in FIG. 5.

Mirror support 12 includes a mounting member 14, a support arm 16, and a mirror holder 18. Mounting member 14 as shown is a generally U-shaped structure that in use is oriented in inverted condition so that it can fit on and be supported by the upper edge of a pickup truck tailgate, as will be hereinafter described. Mounting member 14 includes a first L-shaped member 20, and a second L-shaped member 22. As clearly seen in FIG. 1, the horizontally extending legs 24, 26 of the respective L-shaped members 20, 22 are in overlapping relationship with each other. To support the L-shaped members 20, 22 in a fixed position relative to each other second L-shaped member 26 includes a pair of apertures 28 to each receive a dart-type plastic fastener 30 (see FIG. 2), and first L-shaped member 24 includes an elongated slot 32 through which fasteners 30 are adapted to pass. When fasteners 30 pass through slot 32 and into apertures 28, they are held in position by virtue of the gripping action provided by the barbed ends of fasteners 30 that extend laterally outwardly when they pass through apertures 28, to firmly hold L-shaped members 20 and 22 in a predetermined position relative to each other to define a space or gap between their respective vertical legs 34, 36 so that L-shaped members 20 and 22 when in assembled condition define a U-shaped member to overlie the top edge and to contact the inner and outer faces of a pickup truck tailgate, as is clearly seen in FIG. 5. Furthermore, the spacing between vertical legs 34, 36 of the respective L-shaped members 20, 22 can be changed by sliding each of the L-shaped members relative to each other to narrow or widen the spacing between vertical legs 34, 36. Although disclosed in terms of a dart-type fastener, those skilled in the art will appreciate that other forms of fastener, such as plastic screws and threaded apertures, can also be utilized, if desired, to hold L-shaped members 22 and 24 in a desired relative position and also to enable the spacing between vertical legs 34 and 36 to be changed to adapt mounting member 14 to tailgates of different front-to-back thicknesses.

Vertical leg 36 of second L-shaped member 22 is connected with support arm 16 and is inclined to arm 16 at an acute angle b. Preferably, angle b is within the range of about 20° to about 50°, and most preferably is of the order of from about 30° to about 40°.

As shown in FIGS. 1 and 2, support arm 16 preferably has a longitudinal length greater than that of vertical leg 36, so that mirror holder 18 is positioned a sufficient distance above the top edge of the truck tailgate to enable it to be clearly seen when the mirror support 12 is in its operative position. Moreover, and best seen in FIG. 3, support arm 16 is inclined relative to the longitudinal axis of vertical member 36 at an angle a. Angle a can be of the order of about 5° to about 20°, most preferably of the order of about 10°.

Mirror holder 18 is rigidly connected with and extends generally laterally from the upper or distal end of support arm 16 and toward mounting member 14. Preferably, mirror holder 18 is at an angle c relative to support arm 16, as shown in FIG. 2, wherein angle c can range from about 85° to about 105°, and is preferably about 85°. Additionally, and as best seen in FIG. 4, mirror holder 18 also extends angularly inwardly from support arm 16 toward mounting member 14 at an angle d, relative to the rearwardly facing surface 46 of support arm 16. Preferably, angle d ranges from about 75° to about 90°.

Referring once again to FIG. 1, mirror 10 is carried on mirror holder 18 so that it faces in the general direction of mounting member 14. Mirror 10 is preferably securely mounted to mirror holder 18, such as by a double-faced adhesive strip 52 that can be adhesively attached to mirror holder 18, so that the rear surface of mirror 10 can be secured to mirror holder 18. As shown in FIG. 4, mirror 10 can be mounted to mirror holder 18 in an offset position, if desired, depending upon the geometry of the tailgate of the truck, the position of the trailer hitch, and the desired position of mounting member 14 along the top of the truck tailgate.

Figure 6:
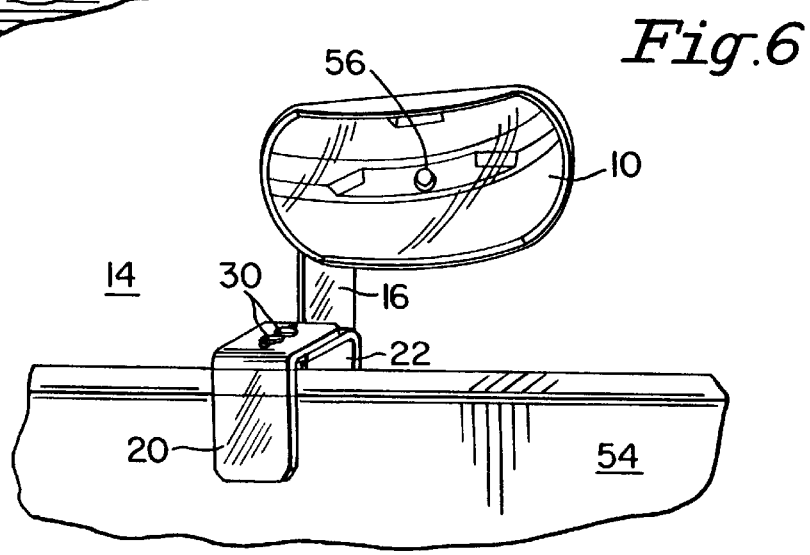
FIG. 6 is a fragmentary rear perspective view of the mirror assembly of FIG. 1 when viewed from within the pickup truck cab while looking rearwardly.

The mirror support structure illustrated in FIGS. 1 through 4 is shown in position on the tailgate 54 of a pickup truck in FIGS. 5 and 6. As there shown, mounting member 14 is positioned to lie on the top edge of tailgate 54, and the respective vertical legs of L-shaped members 20 and 22 face the respective inner and outer surfaces of the tailgate. In that regard, it is preferred that L-shaped member 20 be so configured that horizontal leg 24 and vertical leg 34 are disposed relative to each other at an angle less than 90°, preferably about 80°, so that the lowermost inner edge 38 of leg 34 always contacts the inner face of tailgate 54.

When mounting member 14 is in position with mirror 10 properly oriented, one seated in the driver's seat looking rearwardly will see the mirror in accordance with the present invention as shown in FIG. 6. As shown, the external, forwardly facing, rear mounted mirror carried on tailgate 54 is so oriented as to permit direct viewing of trailer hitch ball 56 that is normally disposed adjacent the rear bumper of the truck. Accordingly, when backing up the truck to permit connection of the truck portion of the trailer hitch with the trailer portion of the hitch, the connection of the respective hitch elements can be conveniently effected by the vehicle operator, without the need for an additional person to provide assistance and guidance.

Depending upon the physical arrangement of the particular truck on which the present invention is positioned, such as tailgate height relative to the position of trailer hitch ball 56, adjustment of the position of mirror 10 may be necessary to permit optimum viewing. In that regard, adjustment of the orientation of mirror 10 to permit convenient sighting of trailer hitch ball 56 is performed by varying the spacing between vertical legs 34 and 36. As the horizontal spacing between vertical legs 34 and 36 is increased, by sliding horizontal legs 24 and 26 relative to each other, support arm 16 and mirror arm 18 pivot rearwardly about lowermost edge 58 of support arm 16. As a result, the field of view of mirror shifts forwardly. When trailer hitch ball 56 is in clear view in mirror 10, the device is correctly configured for that truck. The horizontal legs 24 and 26 are frictionally held in that optimum position for that truck by the pulling force imposed by dart-type fasteners 30, which operate to draw legs 24 and 26 toward each other to increase the frictional force therebetween.

If the device in accordance with the present invention is then positioned on another truck, another adjustment may be necessary for optimum viewing. In that case the horizontal spacing between vertical legs 34 and 36 may need to be narrowed, as a result of which the field of view of mirror 10 shifts rearwardly by virtue of the pivotal movement of support arm 16 and mirror arm 18 about lowermost edge 58 of support arm 16.

Another embodiment of the present invention is illustrated in FIGS. 7, 8, and 9, in which a mirror support structure 60 in accordance with the present invention is shown in a configuration suitable for mounting on the trunk lid of a passenger vehicle. The passenger vehicle embodiment includes a support arm 16 and a mirror holder 18, together with a convex mirror 10, all having the same structure as is illustrated in FIGS. 1 through 4 and described hereinabove for the pickup truck embodiment of the invention.

Mounting member 62 for mounting the mirror support structure to the surface of a passenger car trunk lid 64 is a mounting bracket that includes a first leg 66 and a second leg 68. Legs 66, 68 are disposed relative to each other at an obtuse angle d, which can range from about 120° to about 150°, and preferably is of the order of about 132°. Support arm 16 is slidably adjustable along second leg 68 by the provision of dart-type fasteners 42 and a slot arrangement as in the pickup truck embodiment illustrated in FIGS. 1 through 4. In that regard, second leg 68 includes a pair of longitudinally spaced, elongated slots 70, 72 to permit shifting the position of support arm 16 relative to mounting member 62 by sliding support arm 16 inwardly or outwardly relative to each other, in the same manner as was described in connection with the horizontal legs 24 and 26 in the pickup truck embodiment.

First leg 66 of mounting member 62 can be of substantially the same length as second leg 68, and adjacent its outermost end 74 first leg 66 carries a suction cup 76 for secure, but removable, attachment of mirror support structure 60 to the upper surface of trunk lid 64.

FIG. 9 shows an embodiment of the passenger car version of the invention in position on the trunk lid 64, wherein the orientation of mirror 10 can be changed by sliding support arm 16 relative to mounting member 62, to accommodate trunk lids having different slopes, until the desired position of mirror 10 is achieved for optimal viewing of trailer hitch ball 84.

The effect of the adjustment is best seen in FIG. 7, which shows that when support arm 16 is moved relative to second leg 68 of mounting member 62, the contact point 80 between the proximal end 82 of support arm 16 remains in substantially the same position, while mounting member 62 is pivoted angularly about suction cup 76, to carry with it support arm 16 and mirror arm 18, to permit proper orientation of convex mirror 10 for convenient viewing of trailer hitch ball 84.

A further embodiment of the present invention is illustrated in FIGS. 10 through 12, which show a mirror support structure in position on a rear window 92 of a van or panel truck 94 having at least one rear window. In that regard, mounting member 62 for the van embodiment has the same general structure as the corresponding mounting member for the passenger car embodiment shown in FIGS. 7, 8, and 9, although support arm 96 is somewhat different in that mirror 10 is mounted in a different position. Preferably, in addition to the inclination angle e, which can range from about 120° to about 150°, and is preferably about 148°, the plane of leg 68 is preferably twisted at about a 14° clockwise angle relative to the plane of arm 66, when viewed along support member 96.

Support arm 96 is generally similar in structure to support arm 16, and is movable relative to mounting member 90 in the same manner as is support arm 16 relative to mounting member 62 of the passenger car embodiment. However, support arm 96 does not always require an angularly disposed mirror holder 18 at as large an angle as in the earlier-described embodiments, but, instead, can range from 0°, as shown, to about 10°, depending upon the configuration of the rear of the van. Support arm 96 includes an adhesive support strip 52 that is mounted adjacent the distal end 98 of support arm 96, and on the side of support arm 96 opposite the side that contacts mounting member 90, to face in a generally forwardly direction relative to van 94. As shown in FIGS. 10 and 11, a stop member 100 can be defined at distal end 98 of support arm 96, if desired, to engage an edge of mirror 10.

An embodiment of the van version of the invention is shown in operative position in FIGS. 11 and 12, wherein mirror support 90 includes a suction cup 76 to permit secure connection of the device with the glass defining the rear window of the van. Again, as in the earlier-described embodiments, dart-type fasteners 42 interconnect support arm 96 with mounting member 90 to permit sliding adjustment of support arm 96 relative to mounting member 90 in order to permit proper positioning of mirror 10 for convenient viewing of the area surrounding trailer hitch ball 102. As was the case in connection with the passenger car embodiment, sliding movement of support arm 96 relative to mounting member 90 causes mounting member 90 to pivot about suction cup 76, and thereby changes both the position and the angular orientation of mirror 10 so that proper orientation of the mirror can be effected.

Although particular embodiments of the present invention have been illustrated and described, it will be apparent to those skilled in the art that various changes and modifications can be made without departing from the spirit of the present invention. Accordingly, it is intended to encompass within the appended claims, all such changes and modifications that fall within the scope of the present invention.

What is claimed is:

1. A mirror support structure for supporting a mirror on a rear surface of a vehicle for permitting observation of a trailer hitch element positioned at the lower rear portion of the vehicle by an observer while the observer is seated in the driver's seat of the vehicle, said mirror support structure comprising:

a. a mounting member for removable attachment to a vehicle surface at the rear of a vehicle having a trailer hitch element, wherein the mounting member is positioned above the trailer hitch element and includes a first leg and a second leg, wherein the first and second legs of the mounting member are connected together and define an obtuse included angle therebetween, and wherein the first leg carries a suction cup for engagement with a vehicle outer surface;

b. a support arm extending angularly from the mounting member and disposed at an acute angle relative to the vehicle surface, the support arm slidably carried by the second leg of the mounting member and having an outer end spaced from the mounting member and an inner end in contact with a surface of the vehicle;

c. a mirror mounting surface carried by the support arm and positioned adjacent the outer end of the support arm and facing the trailer hitch element for supporting a convex mirror; and d. a convex mirror carried on the mirror mounting surface, wherein the convex mirror is disposed to face the trailer hitch element to permit an observer seated in the driver's seat of the vehicle to observe the trailer hitch element to thereby facilitate connection and disconnection of the trailer hitch element of the vehicle with a cooperating trailer hitch element carried by a towed vehicle.

2. A mirror support structure in accordance with claim 1, wherein the first and second legs are disposed relative to each other at an obtuse angle of from about 120° to about 150°.

3. A mirror support structure in accordance with claim 2, wherein the mirror mounting surface extends outwardly from a distal end of the support arm in a general direction toward the mounting member and at an angle of from about 85° to about 105° relative to the support arm.

4. A mirror support structure in accordance with claim 2, wherein the support arm is inclined laterally relative to the first leg at an angle of from about 5° to about 20°.

5. A mirror support structure in accordance with claim 2, wherein the proximal end of the support arm contacts the vehicle surface to orient the mirror relative to the trailer hitch element.

6. A mirror support structure in accordance with claim 2, wherein the mirror mounting surface is substantially coplanar with the support arm.

7. A mirror support structure in accordance with claim 1 wherein the vehicle surface at which the inner end of the support arm contacts the vehicle underlies the first leg of the mounting member.

* * * * *